United States Patent
Qiu (10) Patent No.: US 11,461,701 B2
(45) Date of Patent: Oct. 4, 2022

(54) METHOD AND APPARATUS FOR PREVENTING MODEL THEFT DURING MODEL-BASED CLASSIFICATION

(71) Applicant: Alipay (Hangzhou) Information Technology Co., Ltd., Zhejiang (CN)

(72) Inventor: Weifeng Qiu, Zhejiang (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/338,254

(22) Filed: Jun. 3, 2021

(65) Prior Publication Data
US 2022/0100877 A1 Mar. 31, 2022

(30) Foreign Application Priority Data
Sep. 30, 2020 (CN) .......................... 202011061386.9

(51) Int. Cl.
*G06N 20/00* (2019.01)
*G06F 21/62* (2013.01)
(Continued)

(52) U.S. Cl.
CPC .......... *G06N 20/00* (2019.01); *G06F 21/629* (2013.01); *G06K 9/628* (2013.01); *G06N 3/0454* (2013.01); *G06N 5/025* (2013.01)

(58) Field of Classification Search
CPC ........ G06N 20/00; G06N 5/025; G06K 9/628; G06F 21/629
See application file for complete search history.

(56) References Cited

U.S. PATENT DOCUMENTS 10,936,973 B1 * 3/2021 Wang ..................... G06N 20/00
2020/0005133 A1 * 1/2020 Zhang ................. G06N 3/0454
(Continued)

FOREIGN PATENT DOCUMENTS

| CN | 107026731 A | 8/2017 |
|----|-------------|--------|
| CN | 109948663 A | 6/2019 |

(Continued)

OTHER PUBLICATIONS

Papernot, N., McDaniel, P., Wu, X., Jha, S. and Swami, A., May 2016. Distillation as a defense to adversarial perturbations against deep neural networks. In 2016 IEEE symposium on security and privacy (SP) (pp. 582-597). IEEE.*
(Continued)

*Primary Examiner* — Zhitong Chen
(74) *Attorney, Agent, or Firm* — Seed IP Law Group LLP (57) ABSTRACT

Embodiments of the present specification provide a method, apparatus, and electronic device for preventing model theft during classification using a service classification model. The service classification model is a deep neural network for predicting a category of a service object, including an input layer, multiple intermediate layers, and an output layer that are sequentially stacked. The method includes: obtaining feature information of a service object; inputting the feature information into the service classification model for initial prediction to obtain a category corresponding to a maximum initial prediction probability as a target category; determining, based on the target category, disturbance data corresponding to a target layer selected in advance from the input layer, the multiple intermediate layers, and the output layer; inputting the feature information into the service classification model for subsequent prediction, including adding the corresponding disturbance data to data to be input into the target layer; and outputting the target category and a maxi-
(Continued)

mum subsequent prediction probability. This can prevent model theft while ensuring that the prediction results are still usable.

18 Claims, 3 Drawing Sheets

(51) Int. Cl.
*G06K 9/62* (2022.01)
*G06N 5/02* (2006.01)
*G06N 3/04* (2006.01)

(56) References Cited

U.S. PATENT DOCUMENTS

| | | |
|---|---|---|
| 2020/0074486 A1 | 3/2020 | Motohashi et al. |
| 2020/0134391 A1 | 4/2020 | Assaderaghi et al. |
| 2021/0192357 A1* | 6/2021 | Sinha .................. G06N 3/0454 |

FOREIGN PATENT DOCUMENTS

| | | |
|---|---|---|
| CN | 110795703 A | 2/2020 |
| CN | 110941855 A | 3/2020 |

OTHER PUBLICATIONS

He, Z., Rakin, A.S. and Fan, D., 2019. Parametric noise injection: Trainable randomness to improve deep neural network robustness against adversarial attack. In Proceedings of the IEEE/CVF Conference on Computer Vision and Pattern Recognition (pp. 588-597).*

Lee et al., "Defending Against Machine Learning Model Stealing Attacks Using Deceptive Perturbations," arXiv:1806.00054v4 [cs.LG], Dec. 13, 2018, 8 pages.

Zheng et al., "BDPL: A Boundary Differentially Private Layer Against Machine Learning Model Extraction Attacks," *Computer Security—Esorics—Lecture Notes in Computer Science*, 11735:pp. 66-83, 2019.

Chinese Search Report, dated Sep. 30, 2020, for Chinese Application No. 2020110613869, 2 pages.

* cited by examiner

METHOD AND APPARATUS FOR PREVENTING MODEL THEFT DURING MODEL-BASED CLASSIFICATION

BACKGROUND

Technical Field

One or more embodiments of the present specification relate to the field of machine learning technologies, and in particular, to a method, apparatus, and electronic device for preventing model theft during classification using a classification model.

Description of the Related Art

At present, some service platforms can provide classification services to external entities. These service platforms can obtain, through predetermined interfaces, feature data of service objects sent by service requesters, and classify and predict the feature data by using pre-trained classification models, and return obtained prediction results to the service requesters. However, there are some malicious service requesters who constantly send a large amount of feature data to the service platforms to obtain corresponding prediction results. Then, the service requesters use these prediction results as a sample training set to train a classification model, which not only has a high convergence speed, but also has good generalization performance. Only a small number of such samples are needed to obtain a classification model with the same functions as the service platforms, achieving the purpose of stealing the classification model.

BRIEF SUMMARY

One or more embodiments of the present specification provide a method, apparatus, and electronic device for preventing model theft during classification using a classification model.

According to a first aspect, a method for preventing model theft during classification using a service classification model is provided, the service classification model being a deep neural network for predicting a category of a service object, including an input layer, multiple intermediate layers, and an output layer that are sequentially stacked, where the method includes: obtaining feature information of a service object that is input by a service requester through a predetermined or dynamically-generated interface; inputting the feature information into the service classification model for initial prediction to obtain each initial prediction probability corresponding to each category, and using a category corresponding to a maximum initial prediction probability as a target category; determining disturbance data corresponding to each of one or more target layers based on the target category, where the target layer is selected in advance from the input layer, the multiple intermediate layers, and the output layer; inputting the feature information into the service classification model for subsequent prediction, where the subsequent prediction includes adding the disturbance data corresponding to each target layer to data to be input into each target layer, a category corresponding to a maximum subsequent prediction probability obtained through the subsequent prediction is the target category, and the maximum subsequent prediction probability is greater than the maximum initial prediction probability; and outputting the target category and the maximum subsequent prediction probability to the service requester.

In some embodiments, for any target layer, the disturbance data corresponding to the target layer is determined based on the target category in the following way: determining a target function by using the data input into the target layer as an independent variable, where the target function is positively correlated with a prediction probability corresponding to the target category; determining target data input into the target layer in the initial prediction; calculating a gradient value of the target function by using the target data as a value of the independent variable; and determining the disturbance data corresponding to the target layer based on the gradient value.

In some embodiments, determining the disturbance data corresponding to the target layer based on the gradient value includes: obtaining a predetermined or dynamically-generated constant and a predetermined or dynamically-generated function, where the predetermined or dynamically-generated function is not monotonically decreasing; substituting the gradient value as the value of the independent variable into the predetermined or dynamically-generated function to obtain a target result; and calculating a product of the predetermined or dynamically-generated constant and the target result as the disturbance data.

In some embodiments, the predetermined or dynamically-generated function is a sign function.

In some embodiments, the target layer is a last intermediate layer.

In some embodiments, the service object includes one of: a user, a merchant, a product, and an event.

According to a second aspect, an apparatus for preventing model theft during classification using a service classification model is provided, the service classification model being a deep neural network for predicting a category of a service object, including an input layer, multiple intermediate layers, and an output layer that are sequentially stacked, where the apparatus includes: an acquisition module, configured to obtain feature information of a service object that is input by a service requester through a predetermined or dynamically-generated interface; an initial prediction module, configured to input the feature information into the service classification model for initial prediction to obtain each initial prediction probability corresponding to each category, and use a category corresponding to a maximum initial prediction probability as a target category; a determination module, configured to determine disturbance data corresponding to each of one or more target layers based on the target category, where the target layer is selected in advance from the input layer, the multiple intermediate layers, and the output layer; a subsequent prediction module, configured to input the feature information into the service classification model for subsequent prediction, where the subsequent prediction includes adding the disturbance data corresponding to each target layer to data to be input into each target layer, a category corresponding to a maximum subsequent prediction probability obtained through the subsequent prediction is the target category, and the maximum subsequent prediction probability is greater than the maximum initial prediction probability; and an output module, configured to output the target category and the maximum subsequent prediction probability to the service requester.

In some embodiments, for any target layer, the determination module is configured to determine the disturbance data corresponding to the target layer based on the target category in the following way: determining a target function by using the data input into the target layer as an independent variable, where the target function is positively correlated with a prediction probability corresponding to the target category; determining target data input into the target layer in the initial prediction; calculating a gradient value of the target function by using the target data as a value of the independent variable; and determining the disturbance data corresponding to the target layer based on the gradient value.

In some embodiments, the determination module is configured to determine the disturbance data corresponding to the target layer based on the gradient value in the following way: obtaining a predetermined or dynamically-generated constant and a predetermined or dynamically-generated function, where the predetermined or dynamically-generated function is not monotonically decreasing; substituting the gradient value as the value of the independent variable into the predetermined or dynamically-generated function to obtain a target result; and calculating a product of the predetermined or dynamically-generated constant and the target result as the disturbance data.

In some embodiments, the predetermined or dynamically-generated function is a sign function.

In some embodiments, the target layer is a last intermediate layer.

In some embodiments, the service object includes one of: a user, a merchant, a product, and an event.

According to a third aspect, a computer-readable storage medium is provided, the storage medium storing a computer program, and the computer program being executed by a processor to implement the method according to the first aspect.

According to a fourth aspect, an electronic device is provided, including a memory, a processor, and a computer program that is stored in the memory and that can run on the processor, the processor executing the program to implement the method according to the first aspect.

The technical solutions provided in the implementations of the present specification can include the following beneficial effects:

According to the method and apparatus for preventing model theft during classification using a service classification model provided in the embodiments of the present specification, the feature information of the service object that is input by the service requester through the predetermined or dynamically-generated interface is obtained; the feature information is input into the service classification model for initial prediction to obtain each initial prediction probability corresponding to each category, and the category corresponding to the maximum initial prediction probability is used as the target category; the disturbance data corresponding to each of one or more target layers that are selected in advance from the input layer, multiple intermediate layers, and the output layer, is determined based on the target category; the feature information is input into the service classification model for subsequent prediction; and the target category and the maximum subsequent prediction probability are output to the service requester. In the process of the subsequent prediction, the disturbance data determined based on the target category is added to the data to be input into each target layer, so that the category corresponding to the maximum subsequent prediction probability obtained in the subsequent prediction remains unchanged and is still the target category, and the maximum subsequent prediction probability is greater than the maximum initial prediction probability. Therefore, the maximum prediction probability obtained in the subsequent prediction increases, and the prediction result remains correct. However, malicious attackers cannot obtain usable service classification models through training based on a large number of prediction results. This can prevent the model from being stolen while ensuring that the prediction results are still usable.

It should be understood that the previous general description and the following detailed description are merely an example for explanation, and do not limit the present application.

BRIEF DESCRIPTION OF THE SEVERAL VIEWS OF THE DRAWINGS

To describe the technical solutions in the embodiments of the disclosed technology more clearly, the following briefly introduces the accompanying drawings required for describing the embodiments. Clearly, the accompanying drawings in the following description are merely some embodiments of the disclosed technology, and a person of ordinary skill in the art can still derive other drawings from these accompanying drawings without creative efforts.

DETAILED DESCRIPTION

Example embodiments are described in detail here, and examples of the example embodiments are presented in the accompanying drawings. When the following description relates to the accompanying drawings, unless specified otherwise, the same numbers in different accompanying drawings represent same or similar elements. Implementations described in the following example embodiments do not represent all implementations consistent with the present specification. On the contrary, the implementations are only examples of apparatuses and methods that are described in the appended claims in detail and consistent with some aspects of the present specification.

The terms used in the present specification are merely used for the purpose of describing specific embodiments, but are not intended to limit the present application. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present application to describe various types of information, the information should not be limited to the terms. These terms are used merely to differentiate information of the same type. For example, without departing from the scope of the present application, first information may also be referred to as second information, and similarly, the second information may be referred to as the first information. Depending on the context, for example, the word "if" used herein may be explained as "while", "when", or "in response to determining."

Figure 1:
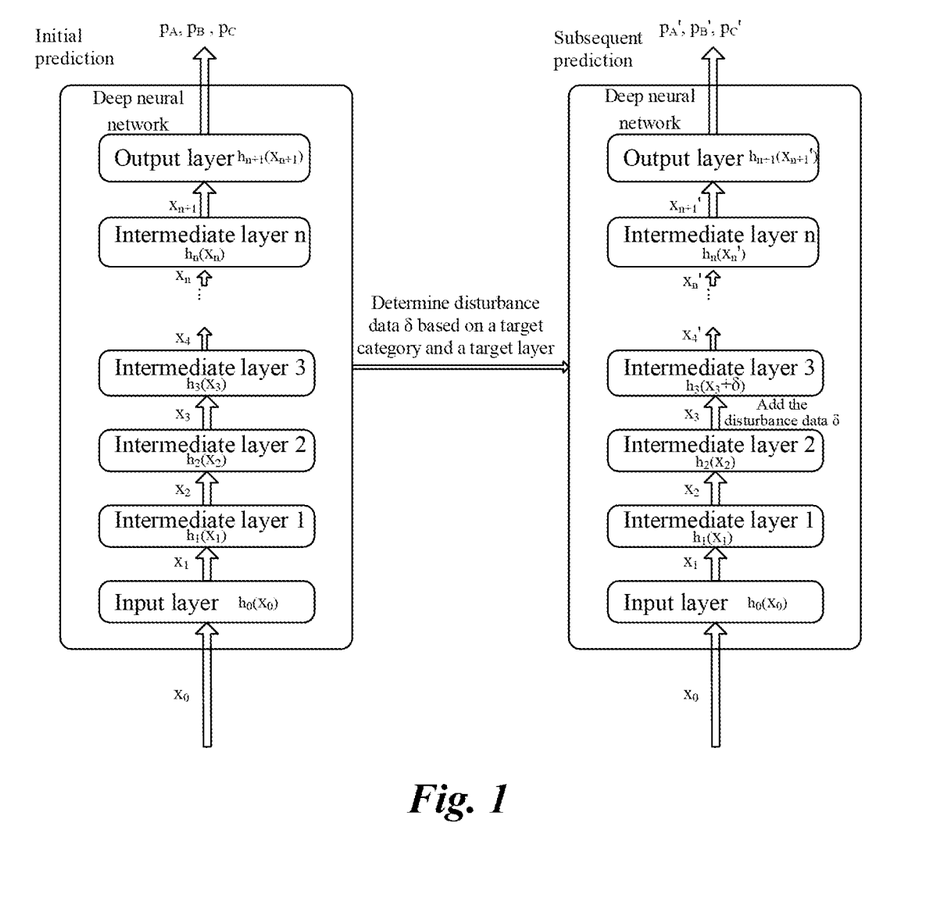
FIG. 1 is a schematic diagram illustrating a scenario for preventing model theft during classification using a classification model according to some example embodiments of the present specification.

FIG. 1 is a schematic diagram illustrating a scenario for preventing model theft during classification using a classification model according to some example embodiments.

In the scenario shown in FIG. 1, the classification model is a deep neural network with prediction and classification functions, and can predict a category of a service object. The deep neural network includes an input layer, n intermediate layers, and an output layer that are sequentially stacked. Assume that the classification model can predict the probabilities of service objects in three categories of A, B, and C. Assume that a function corresponding to the input layer is $h_0(x)$, a function corresponding to the i-th intermediate layer is $h_i(x)$, and a function corresponding to the output layer is $h_{n+1}(x)$. In this case, a function corresponding to the entire classification model is $H(x)=h_{n+1}(h_n( \ldots h_0(x)))=(P_A(x), P_B(x), P_C(x))$, where $P_A(x)$ represents a probabilistic function of the service object in category A, $P_B(x)$ represents a probabilistic function of the service object in category B, and $P_C(x)$ represents a probabilistic function of the service object in category C.

In the process of classification using the classification model, first, feature information $x_0$ of the service object of the service requester is obtained from the predetermined or dynamically-generated interface, and $x_0$ is input into the input layer for initial prediction. After the initial prediction, the probabilities $p_A$, $p_B$, and $p_C$ of the service object in categories A, B, and C can be obtained respectively. Assume that the maximum initial prediction probability is $p_A$. In this case, category A is the target category. Assuming that intermediate layer 3 (the third intermediate layer) is used as the target layer in advance, disturbance data δ can be determined based on target category A and intermediate layer 3.

Specifically, assuming that $h_2(h_1(h_0(x)))=Y$, based on $H(x)=h_{n+1}(h_n( \ldots (h_0(x)))$, it can be determined that $H(x)=h_{n+1}(h_n( \ldots h_3(Y)))=(G_A(Y), G_B(Y), G_C(Y))$, where $P_A(x)=G_A(Y), P_B(x)=G_B(Y), P_C(x)=G_C(Y)$. A function positively correlated with $G_A(Y)$ can be used as the target function. For example, $G_A(Y)$ or $\ln G_A(Y)$ can be used as the target function $f(Y)$ to find a gradient $\nabla f(Y)$ of the target function with respect to X. Then, the feature information $x_0$ is substituted into the function to obtain the gradient value of the target function, that is, $\nabla f(h_2(h_1(h_0(x_0))))=\nabla f(Y_0)$. Finally, the disturbance data δ is determined based on the gradient value.

Then, the feature information $x_0$ is input into the input layer of the classification model for subsequent prediction. Data output at intermediate layer 2 is $x_3$, and the disturbance data δ is added to $x_3$ to obtain $x_3+δ$. Then, $x_3+δ$ is input into the target layer (intermediate layer 3), and probabilities $p_A'$, $p_B'$, and $p_C'$ of the service object in categories A, B, and C are finally obtained. $p_A'$ is still the maximum, and $p_A'$ is greater than $p_A$. At least the target category A and the classification result $p_A'$ can be returned to the service requester.

The following describes in detail the solutions provided in the present specification with reference to specific embodiments.

Figure 2:
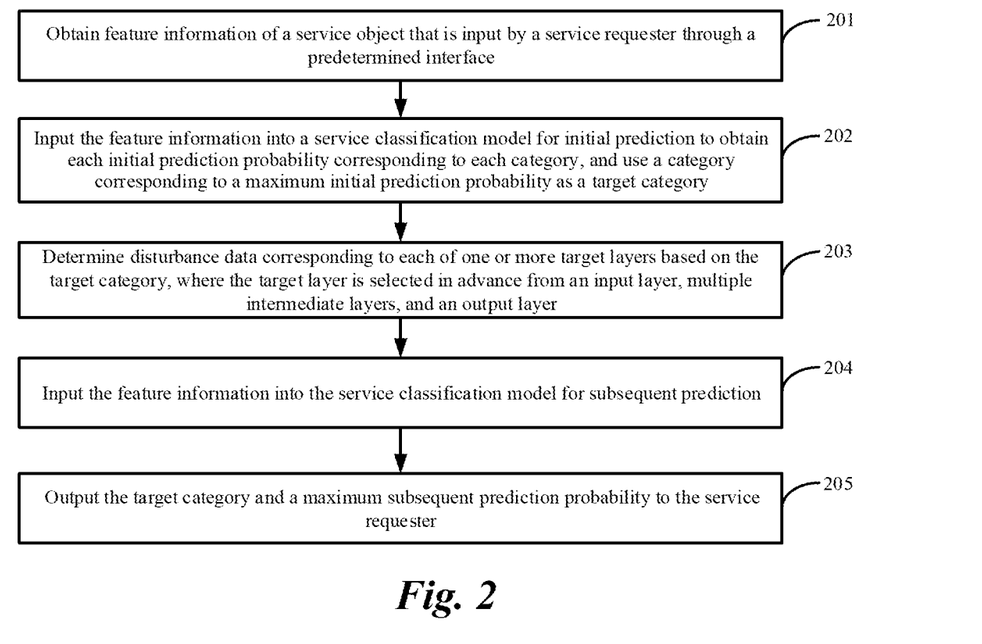
FIG. 2 is a flowchart illustrating a method for preventing model theft during classification using a classification model according to some example embodiments of the present specification.

FIG. 2 is a flowchart illustrating a method for preventing model theft during classification using a classification model according to some example embodiments. The method can be applied to a service provider that can provide a classification service by using a classification model. The service provider can be any device, platform, server, or device cluster with computing and processing capabilities. The method includes the following steps:

Step 201: Obtain feature information of a service object that is input by a service requester through a predetermined or dynamically-generated interface.

In these embodiments, the related service is a classification service provided by using the classification model, the party that can provide the classification service by using the classification model is the service provider, and the party requesting the classification service is the service requester.

In these embodiments, the classification model is a deep neural network, which can include an input layer, multiple intermediate layers, and an output layer that are sequentially stacked. The classification model can be used to predict a category of a service object. The service object can include but is not limited to a user, a merchant, a product, an event, etc. For example, the service object is a user, and the service classification model can be used to predict a consumption level of the user, or predict a credit level of the user, and so on. For another example, the service object is a merchant, and the classification model can be used to predict a fraud risk level of the merchant, and so on. For yet another example, the service object is a transaction event, and the classification model can be used to predict a security level of the transaction event, and so on. It can be understood that the service object and the specific category of the service object are not limited in these embodiments.

In these embodiments, the predetermined or dynamically-generated interface can be a service interface predetermined or dynamically-generated by the service provider, and the service requester can input the feature information of the service object through the predetermined or dynamically-generated interface, so as to obtain the classification result for the service object from the service provider. The service provider can obtain, through the predetermined or dynamically-generated interface, the feature information of the service object input by the service requester.

Step 202: Input the feature information into the service classification model for initial prediction to obtain each initial prediction probability corresponding to each category, and use a category corresponding to a maximum initial prediction probability as a target category.

In these embodiments, the feature information of the service object input by the service requester through the predetermined or dynamically-generated interface can be input into the service classification model for initial prediction. The classification model can predict multiple categories. In the initial prediction, each initial prediction probability corresponding to each of the multiple categories can be obtained, and the category corresponding to the maximum initial prediction probability can be used as the target category.

For example, the categories that can be predicted by the classification model include three categories: A, B, and C. The initial prediction is performed to obtain the initial prediction probability p A corresponding to category A, the initial prediction probability $p_B$ corresponding to category B, and the initial prediction probability $p_C$ corresponding to category C. $p_A>p_B>p_C$, and category A corresponding to $p_A$ can be used as the target category.

Step 203: Determine disturbance data corresponding to each of one or more target layers based on the target category, where the target layer is selected in advance from the input layer, the multiple intermediate layers, and the output layer.

In these embodiments, one or more layers can be randomly selected in advance from the input layer, the multiple intermediate layers, and the output layer as the target layers. The number of target layers and the specific method for selecting the target layers are not limited in these embodiments. In some embodiments, the last intermediate layer can be selected as the target layer, so that the additional calculation amount is smaller.

In these embodiments, the disturbance data corresponding to each of the one or more target layers can be determined based on the target category. For example, target layer a and target layer b are selected in advance, and disturbance data $\delta_a$ corresponding to target layer a and disturbance data $\delta_b$ corresponding to target layer b can be determined separately based on the target category.

Specifically, in some implementations, for any target layer, the disturbance data corresponding to the target layer can be determined based on the target category in the following way: determining a target function by using the data input into the target layer as an independent variable, where the target function is positively correlated with a prediction probability corresponding to the target category. Then, the target data input into the target layer in the initial prediction is determined, a gradient value of a target function is calculated by using the target data as a value of the independent variable, and the disturbance data is determined based on the gradient value.

In some other implementations, for any target layer, the disturbance data corresponding to the target layer can alternatively be determined based on the target category in the following way: arranging the categories predicted by the service classification model in descending order of corresponding initial prediction probabilities; and in addition to the target category, obtaining k−1 categories following the target category, and obtaining the first k categories (k is an integer greater than 1) by adding the target category to the k−1 categories. A target function is determined by using the data input into the target layer as an independent variable, where the target function is positively correlated with a weighted sum of the prediction probabilities corresponding to the first k categories. Then, the target data input into the target layer in the initial prediction is determined, a gradient value of the target function is calculated by using the target data as a value of the independent variable, and the disturbance data is determined based on the gradient value.

It can be understood that the disturbance data corresponding to each target layer can alternatively be determined in any other reasonable manner, which is not limited in these embodiments.

Step 204: Input the feature information into the service classification model for subsequent prediction.

In these embodiments, the feature information can be input into the classification model for subsequent prediction. Specifically, in the process of the subsequent prediction, the disturbance data corresponding to each target layer can be added to the data to be input into each target layer.

For example, target layer a and target layer b are selected in advance, disturbance data corresponding to target layer a is $\delta_a$, and disturbance data corresponding to target layer b is $\delta_b$. In the process of the subsequent prediction, $\delta_a$ is added to data $X_a$ to be input into target layer a to obtain $X_a+\delta_a$, and $X_a+\delta_a$ is input into target layer a. $\delta_b$ is added to data $X_b$ to be input into target layer b to obtain $X_b+\delta_b$, and $X_b+\delta_b$ is input into target layer b.

In these embodiments, after the subsequent prediction, each subsequent prediction probability corresponding to each category can be obtained. The category corresponding to the maximum subsequent prediction probability is the target category, and the maximum subsequent prediction probability is greater than the maximum initial prediction probability. For example, the categories that can be predicted by the classification model include three categories: A, B, and C. The initial prediction is performed to obtain the initial prediction probabilities $p_A$, $p_B$, and $p_C$ corresponding to categories A, B, and C, respectively. A represents the target category. The subsequent prediction is performed to obtain the subsequent prediction probabilities $p_A'$, $p_B'$, and $p_C'$ corresponding to categories A, B, and C, respectively. $p_A'$ is the maximum, and $p_A'$ is greater than $p_A$.

Step 205: Output the target category and the maximum subsequent prediction probability to the service requester.

In these embodiments, some or all of the results obtained in the subsequent prediction can be returned to the service requester. The some or all of the results include at least the target category and the maximum subsequent prediction probability, and can further include other categories and their respective subsequent prediction probabilities, etc.

According to the method for preventing model theft during classification using a classification model provided in the embodiments of the present specification, the feature information of the service object that is input by the service requester through the predetermined or dynamically-generated interface is obtained; the feature information is input into the service classification model for initial prediction to obtain each initial prediction probability corresponding to each category, and the category corresponding to the maximum initial prediction probability is used as the target category; the disturbance data corresponding to each of one or more target layers that are selected in advance from the input layer, the multiple intermediate layers, and the output layer, is determined based on the target category; the feature information is input into the service classification model for subsequent prediction; and the target category and the maximum subsequent prediction probability are output to the service requester. In the process of the subsequent prediction, the disturbance data determined based on the target category is added to the data to be input into each target layer, so that the category corresponding to the maximum subsequent prediction probability obtained in the subsequent prediction remains unchanged and is still the target category, and the maximum subsequent prediction probability is greater than the maximum initial prediction probability. Therefore, the maximum prediction probability obtained in the subsequent prediction increases, and the prediction result remains correct. However, malicious attackers cannot obtain usable classification models through training based on a large number of prediction results. Therefore, model theft can be prevented on the premise that a prediction result is still usable.

Figure 3:
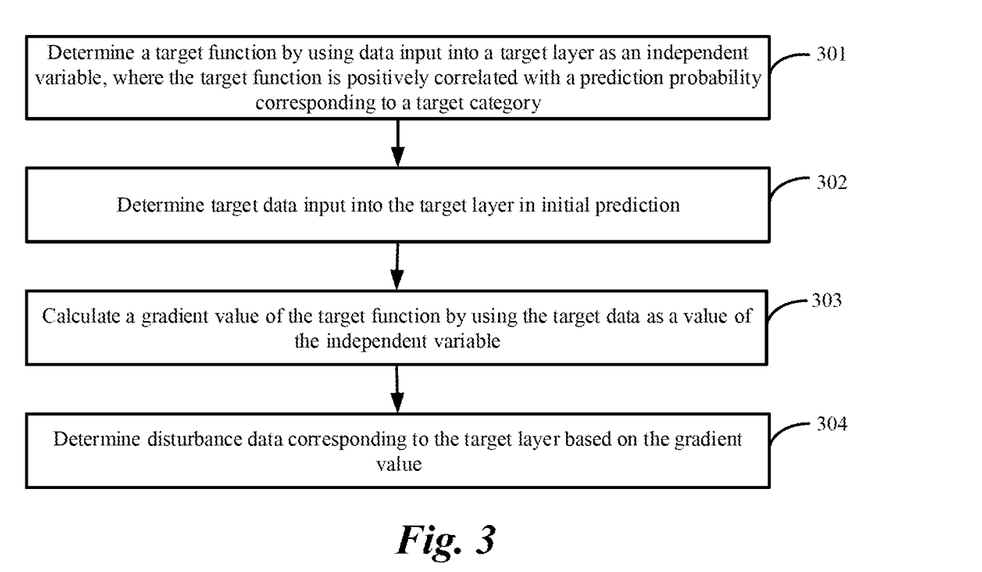
FIG. 3 is a flowchart illustrating another method for preventing model theft during classification using a classification model according to some example embodiments of the present specification.

FIG. 3 is a flowchart illustrating another method for preventing model theft during classification using a classification model according to some example embodiments. These embodiments describe a process of determining disturbance data corresponding to any target layer based on the target category. This method can be applied to a service provider and include the following steps:

Step 301: Determine a target function by using the data input into the target layer as an independent variable, where the target function is positively correlated with a prediction probability corresponding to the target category.

In these embodiments, a target function can be determined by using the data input into the target layer as an independent variable, where the target function is positively correlated with a prediction probability corresponding to the target category. For example, references can be made to the embodiment in FIG. 1. Category A is the target category, and data Y input into the target layer is used as the independent variable. The prediction probability corresponding to category A is $G_A(Y)$, and $G_A(Y)$ or $\ln G_A(Y)$ can be used as the target function f(Y).

Step 302: Determine target data input into the target layer in the initial prediction.

Step 303: Calculate a gradient value of the target function by using the target data as a value of the independent variable.

In these embodiments, the target data input into the target layer in the initial prediction can be determined, and the target data is used as the value of the independent variable and is substituted into the gradient of the target function to calculate the gradient value of the target function. For example, in the initial prediction, the target data of the target layer is $Y_0$, the target function is f(Y), and the gradient of the target function is $\Delta f(Y)$. $Y_0$ is substituted into $\Delta f(Y)$, and the calculated gradient value of the target function is $\Delta f(Y_0)$.

Step 304: Determine the disturbance data corresponding to the target layer based on the gradient value.

In these embodiments, the disturbance data corresponding to the target layer can be determined based on the gradient value. Specifically, first, the predetermined or dynamically-generated constant and the predetermined or dynamically-generated function can be obtained, and then the gradient value is used as the value of the independent variable, and substituted into the predetermined or dynamically-generated function to obtain the target result. The product of the predetermined or dynamically-generated constant and the target result is calculated as the disturbance data corresponding to the target layer. The predetermined or dynamically-generated constant can be any reasonable minimum value determined based on experience, and the specific value of the predetermined or dynamically-generated constant is not limited in these embodiments. The predetermined or dynamically-generated function is not a monotonically decreasing function. For example, the predetermined or dynamically-generated function can be the sign function y=sign(x), or y=x/‖x‖. It can be understood that the specific form of the predetermined or dynamically-generated function is not limited in these embodiments.

For example, the predetermined or dynamically-generated constant is ε, the predetermined or dynamically-generated function is y=sign(x), the gradient value is $\Delta f(Y_0)$, and the disturbance data corresponding to the target layer is δ. In this case, $\delta = \varepsilon \text{sign}(\nabla f(Y_0))$.

In these embodiments, the target function can be determined by using the data input into the target layer as the independent variable, where the target function is positively correlated with the prediction probability corresponding to the target category; the target data input into the target layer in the initial prediction is determined, the gradient value of the target function is calculated by using the target data as the value of the independent variable, and the disturbance data corresponding to the target layer is determined based on the gradient value, thereby obtaining disturbance data with higher quality.

In some implementations, the disturbance data corresponding to any target layer can alternatively be determined based on the target category in the following way: arranging the categories predicted by the service classification model in descending order of corresponding initial prediction probabilities; and in addition to the target category, obtaining k−1 categories following the target category, and obtaining the first k categories (k is an integer greater than 1) by adding the target category to the k−1 categories.

The target function is determined by using the data input into the target layer as the independent variable. The target function can be expressed as $$y = \sum_{i \in R}^{R} p_i \ln p_i,$$

where R represents a set of the first k categories, and pi represents a prediction probability of the i-th category. Then, the target data input into the target layer in the initial prediction is determined, a gradient value of the target function is calculated by using the target data as a value of the independent variable, and the disturbance data is determined based on the gradient value.

It should be noted that although in the previous embodiments, the operations of the methods in the embodiments of the present specification are described in a specific order, this does not require or imply that these operations necessarily be performed in the specific order, or that all the operations shown necessarily be performed to achieve a desired result. On the contrary, the steps depicted in the flowchart can be performed in another order. Additionally or alternatively, some steps can be omitted, multiple steps can be combined into one step for execution, and/or one step can be broken down into multiple steps for execution.

Corresponding to the previous embodiments of the method for preventing model theft during classification using a classification model, the present specification further provides embodiments of an apparatus for preventing model theft during classification using a classification model.

Figure 4:
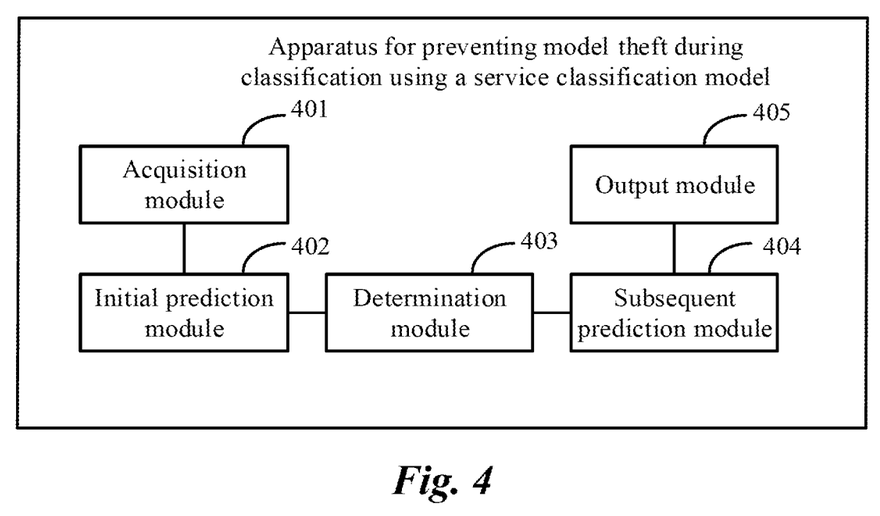
FIG. 4 is a block diagram illustrating an apparatus for preventing model theft during classification using a classification model according to some example embodiments of the present specification.

FIG. 4 is a block diagram illustrating an apparatus for preventing model theft during classification using a classification model according to some example embodiments of the present specification. The classification model is a deep neural network for predicting a category of a service object, including an input layer, multiple intermediate layers, and an output layer that are sequentially stacked. The apparatus can include an acquisition module 401, an initial prediction module 402, a determination module 403, a subsequent prediction module 404, and an output module 405.

The acquisition module 401 is configured to obtain feature information of a service object that is input by a service requester through a predetermined or dynamically-generated interface.

The initial prediction module 402 is configured to input the feature information into the classification model for initial prediction to obtain each initial prediction probability corresponding to each category, and use a category corresponding to a maximum initial prediction probability as a target category.

The determination module 403 is configured to determine disturbance data corresponding to each of one or more target layers based on the target category, where the target layer is selected in advance from the input layer, the multiple intermediate layers, and the output layer.

The subsequent prediction module 404 is configured to input the feature information into the classification model for subsequent prediction, where the subsequent prediction includes adding the disturbance data corresponding to each target layer to data to be input into each target layer, a category corresponding to a maximum subsequent prediction probability obtained through the subsequent prediction is the target category, and the maximum subsequent prediction probability is greater than the maximum initial prediction probability.

The output module 405 is configured to output the target category and the maximum subsequent prediction probability to the service requester.

In some optional implementations, for any target layer, the determination module 403 is configured to determine the disturbance data corresponding to the target layer based on the target category in the following way: determining a target function by using the data input into the target layer as an independent variable, where the target function is positively correlated with a prediction probability corresponding to the target category; determining the target data input into the target layer in the initial prediction; calculating a gradient value of the target function by using the target data as a value of the independent variable; and determining the disturbance data corresponding to the target layer based on the gradient value.

In some other optional implementations, the determination module 403 is configured to determine the disturbance data corresponding to the target layer based on the gradient value in the following way: obtaining a predetermined or dynamically-generated constant and a predetermined or dynamically-generated function, where the predetermined or dynamically-generated function is not monotonically decreasing; substituting the gradient value as a value of the independent variable into the predetermined or dynamically-generated function to obtain a target result; and calculating a product of the predetermined or dynamically-generated constant and the target result as the disturbance data corresponding to the target layer.

In some other optional implementations, the predetermined or dynamically-generated function is a sign function.

In some other optional implementations, the target layer is a last intermediate layer.

In some other optional implementations, the service object includes one of: a user, a merchant, a product, and an event.

It should be understood that the previous apparatus can be arranged in an electronic device in advance, or can be loaded into the electronic device through access, etc. The corresponding modules in the apparatus can cooperate with the modules in the electronic device to implement the solution for preventing model theft during classification using a service classification model.

Because apparatus embodiments basically correspond to method embodiments, for related parts, references can be made to related descriptions in the method embodiments. The described apparatus embodiments are merely examples. The units described as separate parts can be or do not have to be physically separate, and parts displayed as units can be or do not have to be physical units, that is, can be located in one position, or can be distributed on multiple network units. Some or all of the modules can be selected depending on an actual need to achieve the purposes of the solutions in one or more embodiments of the present specification. A person of ordinary skill in the art can understand and implement the embodiments of the present specification without creative efforts.

One or more embodiments of the present specification further provide a computer-readable storage medium. The storage medium stores a computer program. The computer program can be used to perform the method for preventing model theft during classification using a classification model provided in any one of the embodiments in FIG. 2 and FIG. 3.

Figure 5:
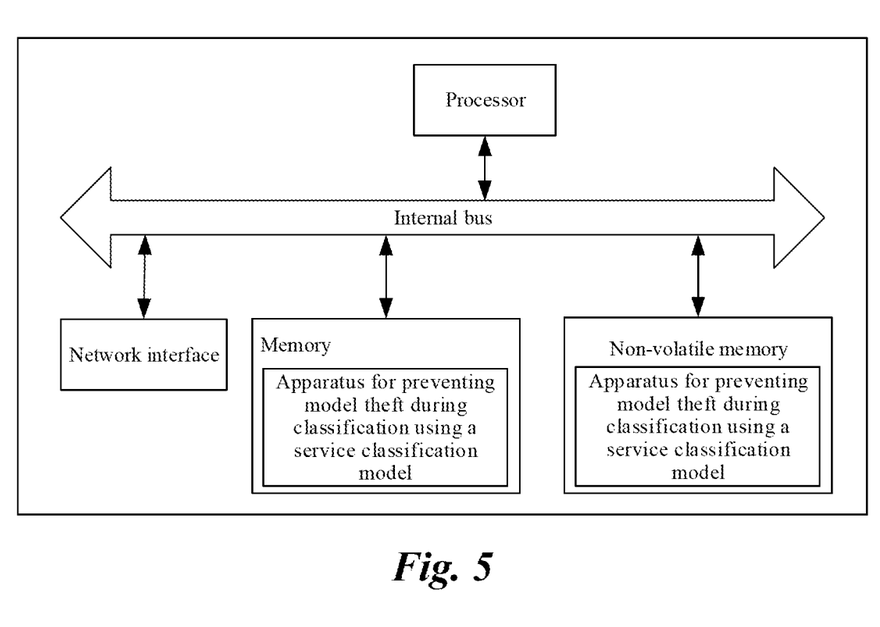
FIG. 5 is a schematic structural diagram illustrating an electronic device according to some example embodiments of the present specification.

Corresponding to the previous method for preventing model theft during classification using a classification model, one or more embodiments of the present specification further provides a schematic structural diagram illustrating an electronic device according to some example embodiments of the present specification, as shown in FIG. 5. References are made to FIG. 5. At the hardware level, the electronic device includes a processor, an internal bus, a network interface, a memory, and a non-volatile memory, and certainly may further include other hardware needed by a service. The processor reads a corresponding computer program from the non-volatile memory to the memory and then runs the computer program to form, at the logic level, an apparatus for preventing model theft during classification using a classification model. Certainly, in addition to software implementations, one or more embodiments of the present specification do not preclude other implementations, such as a logic device or a combination of software and hardware. In other words, an execution body of the following processing procedure is not limited to each logical unit, and can be hardware or a logic device.

After considering the specification and practicing the technology disclosed herein, a person skilled in the art easily figures out other implementation solutions of the present application. The present application is intended to cover any variations, functions, or adaptive changes of the present application. These variations, functions, or adaptive changes comply with general principles of the present application, and include common knowledge or a commonly used technical means in the technical field that is not disclosed in the present application. The present specification and the embodiments are merely considered as examples, and the actual scope and the spirit of the present application are specified by the appended claims.

It should be understood that the present application is not limited to the precise structures that have been described above and shown in the drawings, and various modifications and changes can be made without departing from the scope of the present application. The scope of the present application is limited only by the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for preventing model theft during classification, the method comprising:
   obtaining feature information of an object from a service requester;

inputting the feature information of the object into a pre-trained classification model that outputs initial prediction including respective initial prediction probability corresponding to each category of a plurality of categories, wherein the classification model includes a pre-trained deep neural network including an input layer, a plurality of intermediate layers, and an output layer that are sequentially stacked;

determining, from the plurality of categories, a category corresponding to a maximum initial prediction probability as a target category;

selecting one or more target layers of the deep neural network from the input layer, the plurality of intermediate layers, and the output layer to add disturbance data;

determining disturbance data corresponding to each of one or more target layers based on the target category;

inputting the feature information into the classification model to obtain subsequent prediction including respective subsequent prediction probability corresponding to each category of the plurality of categories, wherein obtaining the subsequent prediction includes adding the disturbance data corresponding to each of the one or more target layers to data to be input into the target layer, a category from the plurality categories that corresponds to a maximum subsequent prediction probability remains the target category, and the maximum subsequent prediction probability is greater than the maximum initial prediction probability; and outputting the target category and the maximum subsequent prediction probability to the service requester.

2. The method according to claim 1, wherein for each target layer, the disturbance data corresponding to the target layer is determined based on the target category and by performing:

determining a target function by using the data input into the target layer as an independent variable, wherein the target function is positively correlated with a prediction probability corresponding to the target category;

determining target data input into the target layer in the initial prediction;

calculating a gradient value of the target function by using the target data as a value of the independent variable; and determining the disturbance data corresponding to the target layer based on the gradient value.

3. The method according to claim 2, wherein determining the disturbance data corresponding to the target layer based on the gradient value includes:

obtaining a constant and a function, wherein the function is not monotonically decreasing;

substituting the gradient value as the value of the independent variable into the function to obtain a target result; and calculating a product of the constant and the target result as the disturbance data.

4. The method according to claim 3, wherein the function is a sign function.

5. The method according to claim 1, wherein selecting the one or more target layers includes selecting at least a last intermediate layer.

6. The method according to claim 1, wherein the object includes at least one of a user, a merchant, a product, or an event.

7. A non-transitory computer readable medium storing contents that, when executed by one or more processors, cause the one or more processors to perform actions comprising:

obtaining feature information of an object from a service requester;

inputting the feature information of the object into a pre-trained classification model that outputs initial prediction including respective initial prediction probability corresponding to each category of a plurality of categories, wherein the classification model includes a pre-trained deep neural network including an input layer, a plurality of intermediate layers, and an output layer that are sequentially stacked;

determining, from the plurality of categories, a category corresponding to a maximum initial prediction probability as a target category;

selecting one or more target layers of the deep neural network from the input layer, the plurality of intermediate layers, and the output layer to add disturbance data;

determining disturbance data corresponding to each of one or more target layers based on the target category;

inputting the feature information into the classification model to obtain subsequent prediction including respective subsequent prediction probability corresponding to each category of the plurality of categories, wherein obtaining the subsequent prediction includes adding the disturbance data corresponding to each of the one or more target layers to data to be input into the target layer, a category from the plurality categories that corresponds to a maximum subsequent prediction probability remains the target category, and the maximum subsequent prediction probability is greater than the maximum initial prediction probability; and outputting the target category and the maximum subsequent prediction probability to the service requester.

8. The computer readable medium according to claim 7, wherein for each target layer, the disturbance data corresponding to the target layer is determined based on the target category and by performing:

determining a target function by using the data input into the target layer as an independent variable, wherein the target function is positively correlated with a prediction probability corresponding to the target category;

determining target data input into the target layer in the initial prediction;

calculating a gradient value of the target function by using the target data as a value of the independent variable; and determining the disturbance data corresponding to the target layer based on the gradient value.

9. The computer readable medium according to claim 8, wherein determining the disturbance data corresponding to the target layer based on the gradient value includes:

obtaining a constant and a function, wherein the function is not monotonically decreasing;

substituting the gradient value as the value of the independent variable into the function to obtain a target result; and calculating a product of the constant and the target result as the disturbance data.

10. The computer readable medium according to claim 9, wherein the function is a sign function.

11. The computer readable medium according to claim 7, wherein selecting the one or more target layers includes selecting at least a last intermediate layer.

12. The computer readable medium according to claim 7, wherein the object includes at least one of a user, a merchant, a product, or an event.

13. A system, comprising:
one or more processors; and
memory storing contents that, when executed by the one or more processors, cause the system to perform actions comprising:
obtaining feature information of an object from a service requester;
inputting the feature information of the object into a pre-trained classification model that outputs initial prediction including respective initial prediction probability corresponding to each category of a plurality of categories, wherein the classification model includes a pre-trained deep neural network including an input layer, a plurality of intermediate layers, and an output layer that are sequentially stacked;
determining, from the plurality of categories, a category corresponding to a maximum initial prediction probability as a target category;
selecting one or more target layers of the deep neural network from the input layer, the plurality of intermediate layers, and the output layer to add disturbance data;
determining disturbance data corresponding to each of one or more target layers based on the target category;
inputting the feature information into the classification model to obtain subsequent prediction including respective subsequent prediction probability corresponding to each category of the plurality of categories, wherein obtaining the subsequent prediction includes adding the disturbance data corresponding to each of the one or more target layers to data to be input into the target layer, a category from the plurality categories that corresponds to a maximum subsequent prediction probability remains the target category, and the maximum subsequent prediction probability is greater than the maximum initial prediction probability; and
outputting the target category and the maximum subsequent prediction probability to the service requester.

14. The system according to claim 13, wherein for each target layer, the disturbance data corresponding to the target layer is determined based on the target category and by performing:
determining a target function by using the data input into the target layer as an independent variable, wherein the target function is positively correlated with a prediction probability corresponding to the target category;
determining target data input into the target layer in the initial prediction;
calculating a gradient value of the target function by using the target data as a value of the independent variable; and
determining the disturbance data corresponding to the target layer based on the gradient value.

15. The system according to claim 14, wherein determining the disturbance data corresponding to the target layer based on the gradient value includes:
obtaining a constant and a function, wherein the function is not monotonically decreasing;
substituting the gradient value as the value of the independent variable into the function to obtain a target result; and
calculating a product of the constant and the target result as the disturbance data.

16. The system according to claim 15, wherein the function is a sign function.

17. The system according to claim 13, wherein selecting the one or more target layers includes selecting at least a last intermediate layer.

18. The system according to claim 13, wherein the object includes at least one of a user, a merchant, a product, or an event.

* * * * *